United States Patent [19]

Herman

[11] 4,116,105

[45] Sep. 26, 1978

[54] FASTENER

[76] Inventor: Hainbuchner Herman, 13910 EnterPrise Ave., Cleveland, Ohio 44135

[21] Appl. No.: 815,154

[22] Filed: Jul. 13, 1977

[51] Int. Cl.[2] .............................................. F16B 13/04
[52] U.S. Cl. ..................................... 85/66; 29/526 A; 85/10 E
[58] Field of Search ...................... 85/66, 63, 23, 10 E; 151/41.73, 23, 8, 70, 57, 41.74; 29/522, 523, 525, 526

[56] References Cited

U.S. PATENT DOCUMENTS

| 1,333,880 | 3/1920 | Stine | 85/66X |
|---|---|---|---|
| 3,212,796 | 10/1965 | Neuschotz | 151/57 X |

Primary Examiner—Ramon S. Britts
Attorney, Agent, or Firm—John F. Luhrs

[57] ABSTRACT

A fastener for joining heavy walled ferrous or non-ferrous metal workpieces comprising a solid metal cylinder disposed within a circular recess in a workpiece and having one or more bore holes each forming an acute angle with the axis of the cylinder extending through the cylinder from one end face to and through the cylindrical wall adjacent to the other end face receiving and directing a projectile whereby the projectile forms a wedge deforming the adjacent surfaces of the workpiece, cylinder and projectile thereby locking together the projectile, workpiece and cylinder. The cylinder may be provided with a circumferential recess housing a sealing gasket, such as an O-Ring, to provide a pressure type seal between the cylinder and a workpiece.

8 Claims, 3 Drawing Figures

FASTENER

This invention relates to fasteners and more particularly to fasteners of the type wherein two workpieces are joined by firing a projectile into the workpieces as a means of locking them together.

One object of the invention is to provide a fastener for locking together two relatively thick walled metal workpieces.

Another object of the invention is to provide a fastener which is readily adapted to the pressure tight sealing of holes, cracks and other defects in heavy walled pressure vessels.

A further object of the invention is to provide a fastener having substantially isotropic resistance to forces which may be impressed thereon.

Still another object of the invention is to provide a fastener readily adapted to a wide variety of applications.

These and other objects of the invention will be apparent from the following description and drawings in which like character references designate like or corresponding parts throughout the several views.

IN THE DRAWINGS

DETAILED DESCRIPTION

Figure 1:
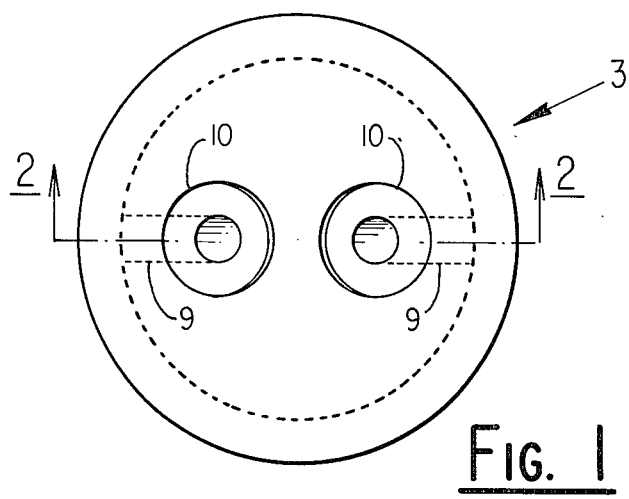
FIG. 1 is a plan view of one form of fastener structure.
Figure 2:
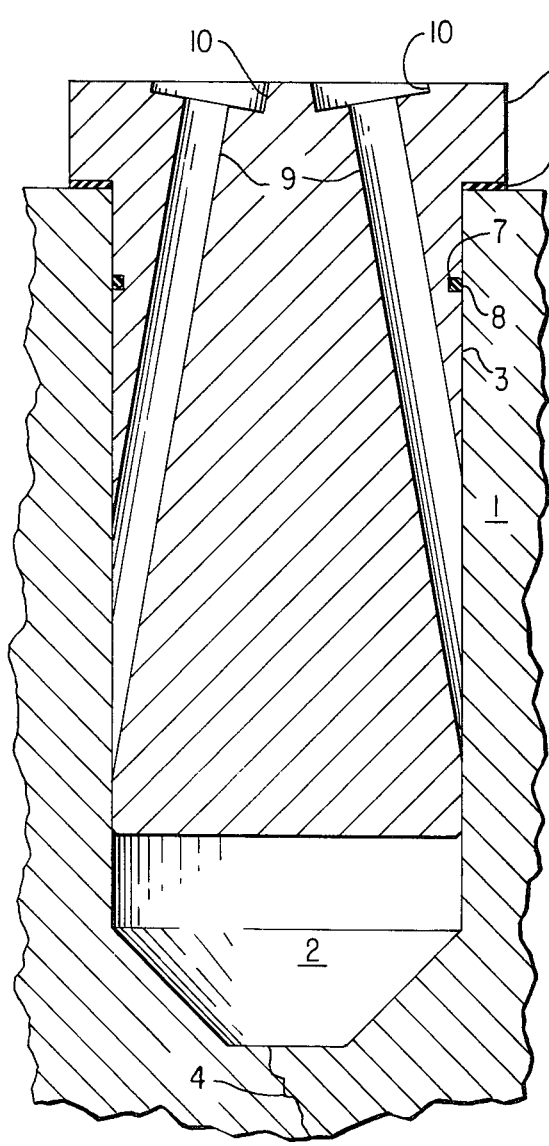
FIG. 2 is an elevation view in cross section taken along the lines 2—2 of FIG. 1 in the direction of the arrows before the insertion of a locking projectile.
Figure 3:
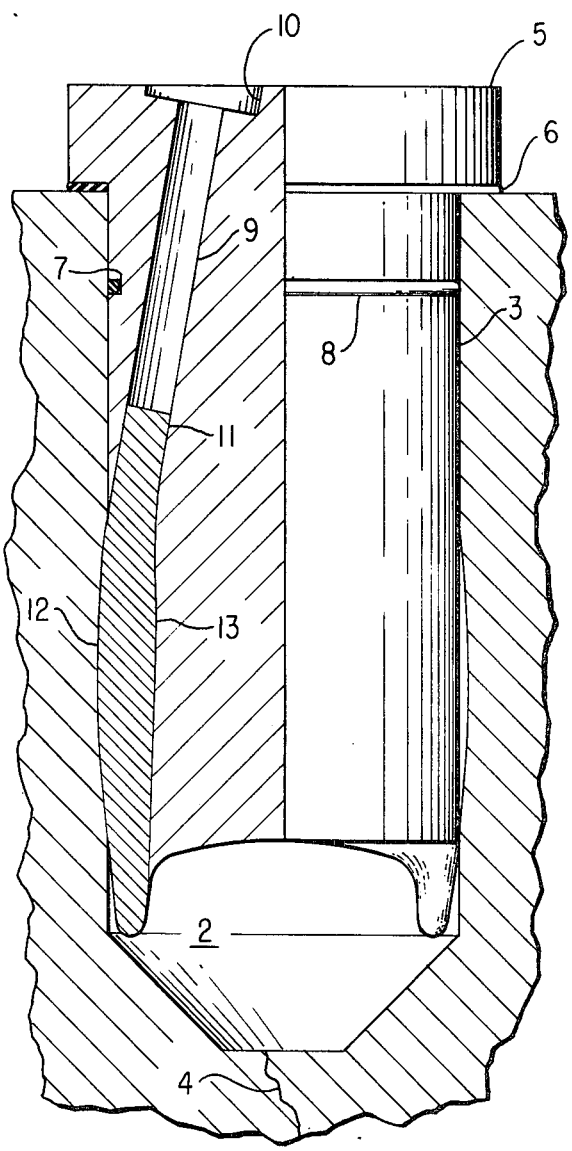
FIG. 3 is an elevation view similar to FIG. 2, partially in cross section, after the insertion of a locking projectile.

Referring to the drawings there is shown a workpiece 1 in which there has been bored, drilled or otherwise formed, a cylindrical recess 2 receiving with small clearance a solid metal cylinder generally indicated at 3. The recess 2 may be a blind hole as shown in FIGS. 2 and 3, or a through hole depending upon the exigencies of a particular application. Further, in some applications, as, for example, when the fastener is used to seal a hole, crack or other defect such as shown at 4 in the workpiece 1, the cylinder 3 forms one workpiece, of a pair of workpieces, the other of which is the workpiece 1. In other applications, as apparent, the fastener may be used to join two separate workpieces.

The cylinder 3 may be provided with a flange 5, adapted to rest on the surface of the workpiece 1 and between which a gasket 6 may be placed to provide a pressure type seal between the cylinder and work piece. Further, the cylinder 3 may be provided with one or more anular grooves 7 and sealing gasket 8, such as an O-Ring as a means of providing a pressure tight seal between the cylinder and workpiece.

Within the cylinder 3 are located one or more bore holes 9 extending from the upper flat end of the cylinder 3, as shown in the drawings, to and through the cylindrical wall of the cylinder adjacent to the lower or opposite flat end. Each bore hole 9 forms an acute angle with the axis of the cylinder 3, which, by way of example, may be in the order of 5° to 10°. Preferably the center line of each bore hole 9 lies in a plane including the axis of the cylinder 3 and lies entirely to one side of the axis. By adjacent is meant there is left, in the usual application, a fraction of an inch, in the order of ⅜ of an inch, of cylindrical wall between the bore hole and the lower end face of the cylinder. As apparent this demension may be varied as required to adapt the fastener to a particular application.

As shown at 10, each bore hole 9 may be countersunk to locate and aim the nozzle of a gun, not shown, for shooting a projectile 11 into the bore hole, which serves to direct the projectile against the wall of the workpiece 1.

In FIG. 3 there is illustrated the fastener after firing the projectile. Upon striking the surface of the workpiece 1, a projectile does not pierce the workpiece but is bent to essentially follow the boundary line between the surfaces of the cylinder and workpiece and break through the cylinder into the cavity below the end face. This trajectory is due to the acute angle of contact and the bullet nose of the projectile. In the process the adjacent walls of the workpiece and cylinder are compressed inwardly as shown at 12 and 13 respectively in somewhat exaggerated form for purposes of illustration and the projectile bulged outwardly to firmly lock the workpiece 1 and cylinder 3 together.

I claim:

1. A fastener comprising a solid metal cylinder for use with a workpiece having a cylindrical cavity receiving said cylinder, said cylinder provided with a bore hole forming an acute angle with the axis of said cylinder running through said cylinder from one end face to the cylindrical wall thereof and a spent projectile which has been fired into said bore hole from said end face lodged in said bore hole and having a bulged extension disposed between the cylindrical walls of said cavity and cylinder whereby said walls are deformed to the contour of said bulge.

2. A fastener as set forth in claim 1 wherein said cylinder is provided with a plurality of bore holes.

3. A fastener as set forth in claim 1 wherein the center line of said bore holes lies in a plane passing through the axis of said cylinder.

4. A fastener as set forth in claim 3 wherein said bore hole is disposed on one side of the axis of said cylinder.

5. A fastener as set forth in claim 1 wherein said cylinder is provided with an anular recess in the cylindrical wall and a sealing gasket disposed within said recess.

6. A fastener as set forth in claim 5 wherein said sealing gasket is an O-Ring.

7. A fastener as set forth in claim 1 wherein the acute angle between said bore hole and the axis of said cylinder is between five degrees and ten degrees.

8. A fastener as set forth in claim 1 wherein said projectile when fired into said bore hole partially extends beyond said other end face of said cylinder into the cavity formed in said workpiece.

* * * * *